US011001327B1

(12) United States Patent
Santurbane et al.

(10) Patent No.: US 11,001,327 B1
(45) Date of Patent: May 11, 2021

(54) PEDAL DETECTION DEVICES FOR BICYCLES

(71) Applicant: SRAM, LLC, Chicago, IL (US)

(72) Inventors: Mark Santurbane, Colorado Springs, CO (US); Mason Pluimer, Spearfish, SD (US); Geoff Nichols, San Luis Obispo, CA (US); Kevin Wesling, Lombard, IL (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/795,066

(22) Filed: Feb. 19, 2020

(51) Int. Cl.
*B62J 45/414* (2020.01)
*B62J 45/421* (2020.01)
*B62M 3/08* (2006.01)

(52) U.S. Cl.
CPC ........... *B62J 45/414* (2020.02); *B62J 45/421* (2020.02); *B62M 3/08* (2013.01)

(58) Field of Classification Search
CPC ...... B62J 45/414; B62J 45/421; B62J 45/413; B62J 45/412; B62M 3/08
See application file for complete search history.

(56) References Cited

U.S. PATENT DOCUMENTS

| | | | |
|---|---|---|---|
| 5,326,119 A | 7/1994 | Ganoung | |
| 8,899,110 B2 | 12/2014 | Matsumoto | |
| 9,075,076 B2 | 7/2015 | Baechler | |
| 9,810,593 B2 | 11/2017 | Carrasco Vergara et al. | |
| 2010/0263468 A1 | 10/2010 | Fisher et al. | |
| 2014/0102237 A1 | 4/2014 | Jordan et al. | |
| 2014/0114538 A1 | 4/2014 | Shipman et al. | |
| 2015/0053494 A1 | 2/2015 | Belon et al. | |
| 2015/0111675 A1 | 4/2015 | Shipman et al. | |
| 2016/0339986 A1 | 11/2016 | Jordan et al. | |
| 2017/0097375 A1* | 4/2017 | Liu | G01P 3/44 |
| 2018/0011122 A1 | 1/2018 | Nichols et al. | |
| 2018/0186419 A1 | 7/2018 | Shipman et al. | |

FOREIGN PATENT DOCUMENTS

| | | |
|---|---|---|
| EP | 2072387 | 6/2009 |
| EP | 2433097 | 3/2012 |
| EP | 2562073 | 2/2013 |
| JP | 2002264882 | 9/2002 |
| JP | 2014008789 | 1/2014 |
| TW | I537175 | 6/2016 |

(Continued)

OTHER PUBLICATIONS

Hongjiang Lyu in BikeLoc "a Real-time High-Precision Bicycle Localization System Using Synthetic Aperture Radar", Aug. 3-4, 2017, 7 pages.

(Continued)

*Primary Examiner* — Vicky A Johnson

(57) ABSTRACT

Example pedal detection devices for bicycles are described herein. An example a pedal detection device includes an electronics module to be disposed in a spindle of a crankset of the bicycle. The electronics module includes a sensor to detect angular velocity and/or position of the spindle, a driver, and an expander wedge movably coupled to the electronics module via the driver. Axial movement of the expander wedge relative to the electronics module causes the expander wedge to expand radially.

13 Claims, 9 Drawing Sheets

(56) References Cited

FOREIGN PATENT DOCUMENTS

| WO | 2014113874 | 7/2014 |
|----|------------|--------|
| WO | 2015074140 | 5/2015 |
| WO | 2016004780 | 1/2016 |
| WO | 2016009535 | 1/2016 |
| WO | 2016030768 | 3/2016 |

OTHER PUBLICATIONS

Cyclocross Magazine, "Easton Launches New Cinch Power Meter and Shifting Rings—First Ride Review", Apr. 19, 2017, 21 pages, https://www.cxmagazine.com/easton-cinch-power-meter-shifting-rings-ec90-sl-crankset-ride-review.

* cited by examiner

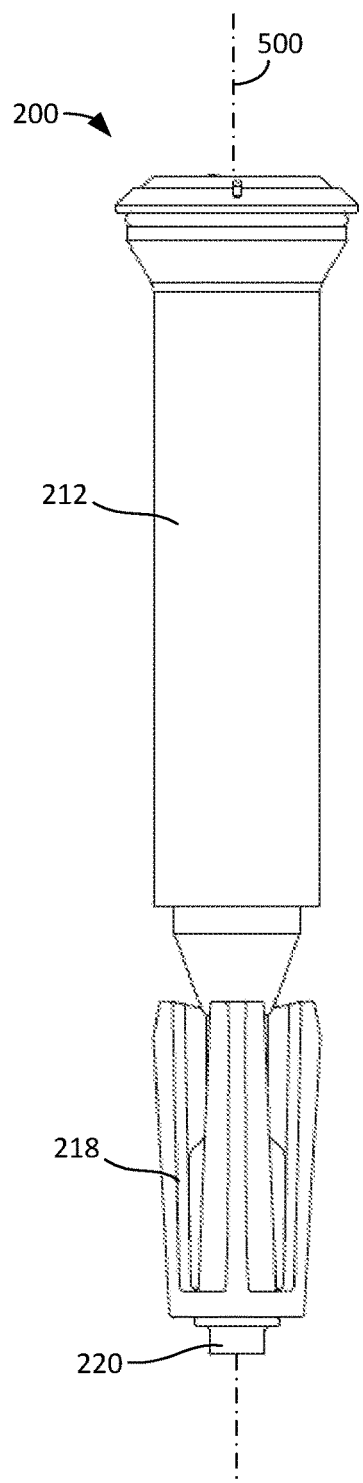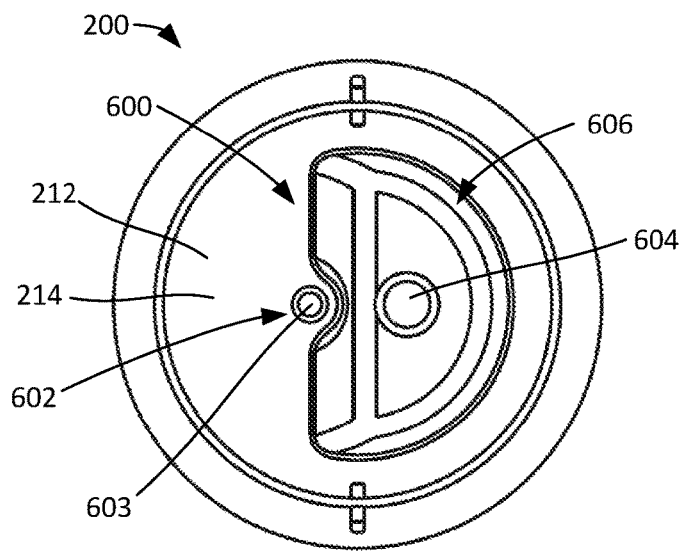
FIG. 6
FIG. 5

PEDAL DETECTION DEVICES FOR BICYCLES

FIELD OF THE DISCLOSURE

This disclosure relates generally to bicycle components and, more specifically, to pedal detection devices for bicycles.

BACKGROUND

Pedal detection devices or cadence sensors are often used on bicycles to detect or measure pedal activity. These known devices or sensors are mounted externally on the crank, crank arm, and/or frame of the bicycle. The pedal activity information can be used to refine suspension settings and/or other parameters of the bicycle to improve rider comfort and/or performance.

SUMMARY

An example a pedal detection device for a bicycle is disclosed herein. The pedal detection device includes an electronics module to be disposed in a spindle of a crankset of the bicycle. The electronics module includes a sensor to detect angular velocity and/or position of the spindle, a driver, and an expander wedge movably coupled to the electronics module via the driver. Axial movement of the expander wedge relative to the electronics module causes the expander wedge to expand radially.

An example crankset for a bicycle is disclosed herein. The crankset includes a spindle having a first end, a second end opposite the first end, and a channel formed between a first opening in the first end and a second opening in the second end, a first crank arm coupled to the first end of the spindle, a second crank arm coupled to the second end of the spindle, and a pedal detection device at least partially disposed in the channel of the spindle. The pedal detection device includes an electronics module including a sensor to detect angular velocity and/or position of the spindle, and an expander wedge to secure the electronics module to the spindle.

An pedal detection device for a bicycle is disclosed herein. The pedal detection device includes an electronics module to be disposed in a spindle of a crankset of the bicycle. The electronics module includes a body defining a cavity to receive a battery, a circuit board coupled to the body along the cavity, such that when the battery is disposed in the cavity, the battery is disposed adjacent the circuit board, and a sensor to detect angular velocity and/or position of the spindle.

BRIEF DESCRIPTION OF THE DRAWINGS

In FIG. 2, the example pedal detection device is shown as separated from an example spindle of the example crankset.

FIG. 5 is a side view of the example pedal detection device of FIG. 2.

FIG. 6 is an end view of the example pedal detection device of FIG. 2.

In FIG. 8, an example expander wedge of the example pedal detection device has not been expanded.

In FIG. 10, the example expander wedge has been expanded.

The figures are not to scale. Instead, the thickness of the layers or regions may be enlarged in the drawings. In general, the same reference numbers will be used throughout the drawing(s) and accompanying written description to refer to the same or like parts.

Figure 1:
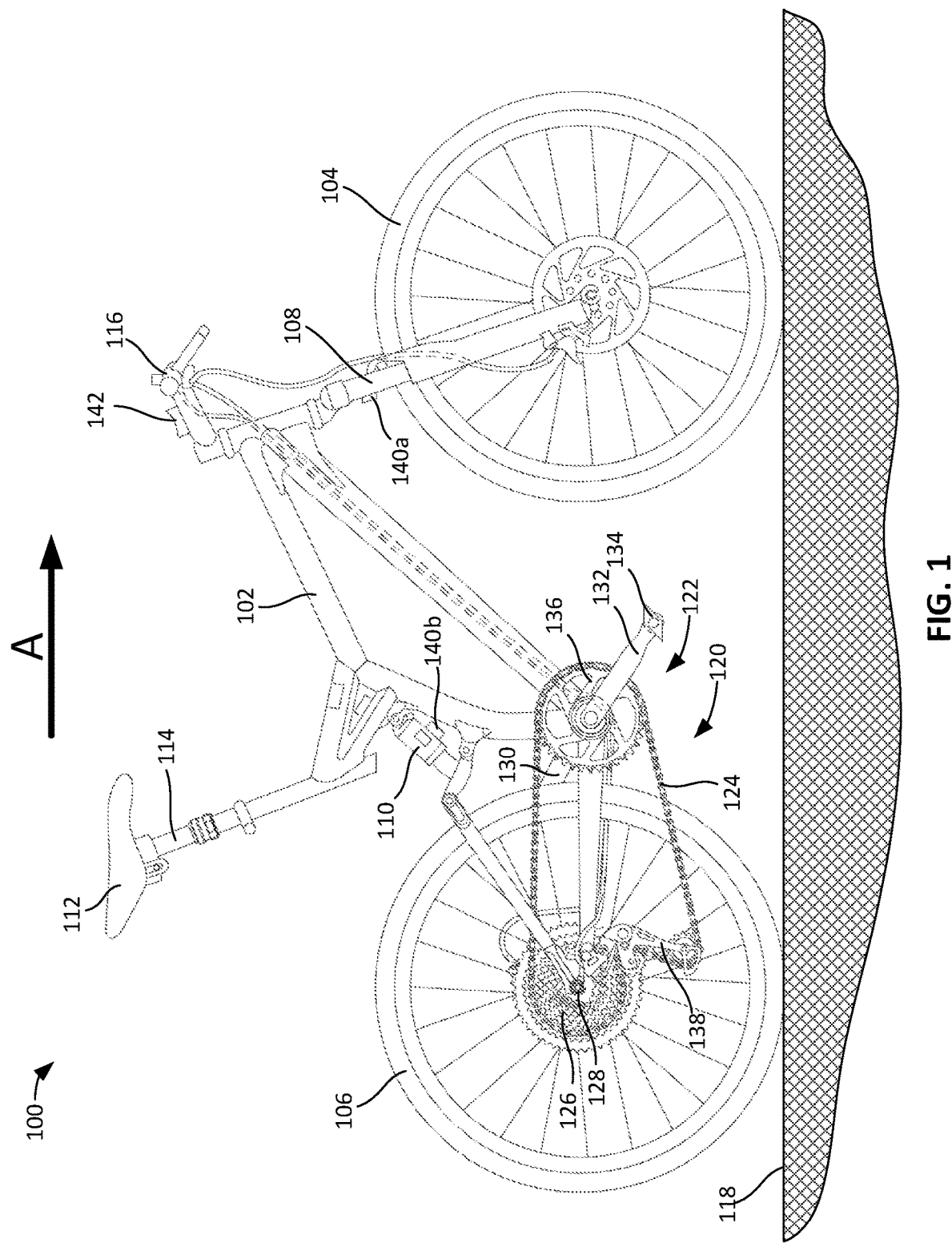
FIG. 1 is a side view of an example bicycle that may employ example pedal detection devices constructed in accordance with the teachings of this disclosure.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example pedal detection devices for bicycles. The example pedal detection devices are configured to measure or detect pedal activity of a bicycle. The example pedal detection devices disclosed herein are configured to be disposed in a spindle (crank axle) of a crankset. Therefore, unlike known pedal detection devices that are externally mounted to the crank arms or frame, the example pedal detection devices disclosed herein are protected and less susceptive to damage from the surrounding environment. Further, this arrangement also results in a more aesthetically pleasing package for a user.

The example pedal detection devices include one or more sensors (e.g., an accelerometer, a gyroscope, etc.) to measure or detect angular velocity and/or position of the spindle. These measurements can be used to determine various parameters of pedal activity, such as whether the rider is pedaling, the velocity of pedaling, the acceleration of pedaling, etc. In some examples, the pedal detection device includes a wireless transmitter (e.g., a Bluetooth® transmitter) to transmit the measurement(s) and/or pedal activity information to another device. The information can be used to track rider performance and/or used to control various aspects of the bicycle (e.g., changing a damping setting on a suspension component). The example pedal detection devices can detect pedal activity at a relatively fast rate for near instantaneous pedal activity detection.

Example pedal detection devices disclosed herein include an electronics module. The electronics module has a tubular body that houses one or more electrical components, such as a power supply (e.g., a battery), a printed circuit board, a sensor, etc. The electronics module can be inserted into the spindle through an opening in one end of the spindle. Once inserted, an end of the electronics module is substantially aligned with the end of the spindle. The end of the electronics module may include a user interface with one or more buttons or indicators to interact with the pedal detection device.

To secure or lock the electronics module within the spindle, the example pedal detection devices disclosed herein include a retaining member. The retaining member can be coupled to the electronics module and inserted into the spindle with the electronics module. The retaining member can then be actuated to secure or lock the electronics module within the spindle. In this manner, the electronics module is fixed to and rotates with the spindle, which enables the sensor(s) to detect rotational motion of the spindle. In some examples, the retaining member is actuated by moving the retaining member axially relative to the electronics module.

In some examples, the retaining member is implemented as an expander wedge. The expander wedge is movably coupled to the electronics module via a driver. The expander wedge is inserted into the spindle with the electronics module. The expander wedge can be moved axially toward or away from the electronics module via the driver. This axial movement of the expander wedge relative to the electronics module causes the expander wedge to expand or contract radially, which can be used to secure the expander wedge and, thus, the electronics module to the spindle. For example, the axial movement may cause the expander wedge to expand radially into engagement with an inner surface of the spindle. The expander wedge may have retaining features that engage the inner surface of the spindle and create a frictional engagement that locks the expander wedge and, thus, the pedal detection device, in place. In some examples, the expander wedge includes an adjusting feature, such as the driver, that, if regulated, can modify the expansion of the expander wedge and, thus, control the force the expander wedge exerts against the inner surface of the spindle.

In some examples, the retaining features are implemented as one or more flexible arms of the expander wedge. The driver may be implemented as a threaded fastener, such as a bolt, that extends through the expander wedge and into a threaded bore formed in the end of the electronics module. The bolt can be screwed into or out of the second end of the electronics module to move the expander wedge axially toward or away from the second end of the electronics module. Therefore, the expander wedge is movably coupled to the end of the electronics module via the bolt. The end of the electronics module has a tapered portion. Therefore, as the bolt is screwed into the end of the electronics module and the expander wedge is moved toward the tapered portion, the arms of the expander wedge slide along the tapered portion and are forced to move radially outward by the tapered portion. This forces the arms into engagement with an inner surface of the spindle. This engagement creates a strong frictional contact that holds the expander wedge and, thus, the electronics module in the spindle. The arms may engage the inner surface of the spindle at the same axial and radial dimensions or different axial and radial dimensions. To remove the pedal detection device from the spindle, the bolt may be unscrewed from the second end of the electronics module, which moves the expander wedge axially away from the end of the electronics module, thereby enabling the flexible arms to contract radially inward and move away from the inner surface of the spindle. Then the pedal detection device can be removed from the spindle. In some examples, the bolt is accessed through an opposite end of the spindle into which the pedal detection device is inserted.

As mentioned above, the electronics module can include a circuit board and a battery. In some examples, the battery is coupled to a side of the circuit board. For example, the circuit board may be disposed longitudinally within or along a body of the electronics module, and the battery may be disposed longitudinally adjacent the circuit board. This arrangement results in a relatively small, compact package.

Turning now to the figures, FIG. 1 illustrates one example of a human powered vehicle on which example pedal detection devices and example cranksets with the example pedal detection devices disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a first or front suspension component, such as a front fork 108, and supports the front end of the frame 102. The rear wheel 106 is coupled to the rear end of the frame 102, and may be supported by a second or rear suspension component, such as a rear shock 110. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 112 coupled to the frame 102 (e.g., near the rear end of the frame 102 relative to the forward direction A) via a seat post 114. The bicycle 100 also includes handlebars 116 coupled to the frame 102 and the front fork 108 (e.g., near a forward end of the frame 102 relative to the forward direction A) for steering the bicycle 100. The bicycle 100 is shown on a riding surface 118. The riding surface 118 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 120 that includes a crankset 122 (sometimes referred to as a crank assembly). The crankset 122 is operatively coupled via a chain 124 to a sprocket assembly 126 mounted to a hub 128 of the rear wheel 106. The crankset 122 includes at least one, and typically two, crank arms 130, 132 and pedals 134 (only one pedal 134 is shown in FIG. 1) coupled to the crank arms 130, 132, along with at least one front sprocket, or chainring 136. The crank arms 130, 132 are connected by a spindle (shown in further detail in FIG. 2) that extends through a bottom bracket shell (e.g., a journal) within the frame 102. A rear gear change device 138, such as a derailleur, is disposed at the rear wheel 106 to move the chain 124 through different sprockets of the sprocket assembly 126. Additionally or alternatively, the bicycle 100 may include a front gear change device to move the chain 124 through gears on the chainring 136.

Example pedal detection devices are disclosed herein that can be implemented in connection with the crankset 122. An example pedal detection device can be used to measure and/or detect pedal activity. This information can be used to track rider metrics (e.g., number of pedals, speed of pedaling, etc.). Additionally or alternatively, this information can also be used to control or adjust parameters of other components of the bicycle 100. The pedal detection device may be part of a system of electronic device(s) used for monitoring and/or controlling various components of the bicycle 100. For example, the example bicycle 100 includes electronic device(s) 140a, 140b. The electronic device(s) 140a, 140b may be used to measure various parameters of the bicycle components and/or control aspects of the bicycle components. For example, the electronic device 140a may be used to change the damping rate of the suspension component of the front fork 108. Electronic device(s) may be implemented in connection with any component of the bicycle 100 such as the seat post 114, the brakes, the rear gear change device 138, etc. The electronic device(s) may control various parameters of their respective components based on information and/or commands from other devices. The electronic device(s) may communicate directly with each other and/or via a master controller 142. The master controller 142 may provide an interface between the electronic device(s) 140a, 140b and the user. The electronic device(s) 140a, 140b can wirelessly transmit the measured characteristics to the master controller 142. In other examples, the bicycle 100 may include one or more wired connections (e.g., wires, cables, etc.) to communicatively couple the electronic device(s) and the master controller 142. The master controller 142 can include a display to present the measured characteristics to a user (e.g., a rider). In some examples, the master controller 142 is a device distinct from the bicycle 100, such as a handheld mobile computing device, a smartphone, or other computer.

While the example bicycle 100 depicted in FIG. 1 is a type of mountain bicycle, the example pedal detection devices and the example cranksets disclosed herein can be implemented on other types of bicycles. For example, the disclosed pedal detection devices and cranksets may be used on road bicycles, as well as bicycles with mechanical (e.g., cable, hydraulic, pneumatic, etc.) and non-mechanical (e.g., wired, wireless) drive systems. The disclosed pedal detection devices and cranksets may also be implemented on other types of two-, three-, and four-wheeled human powered vehicles.

Figure 2:
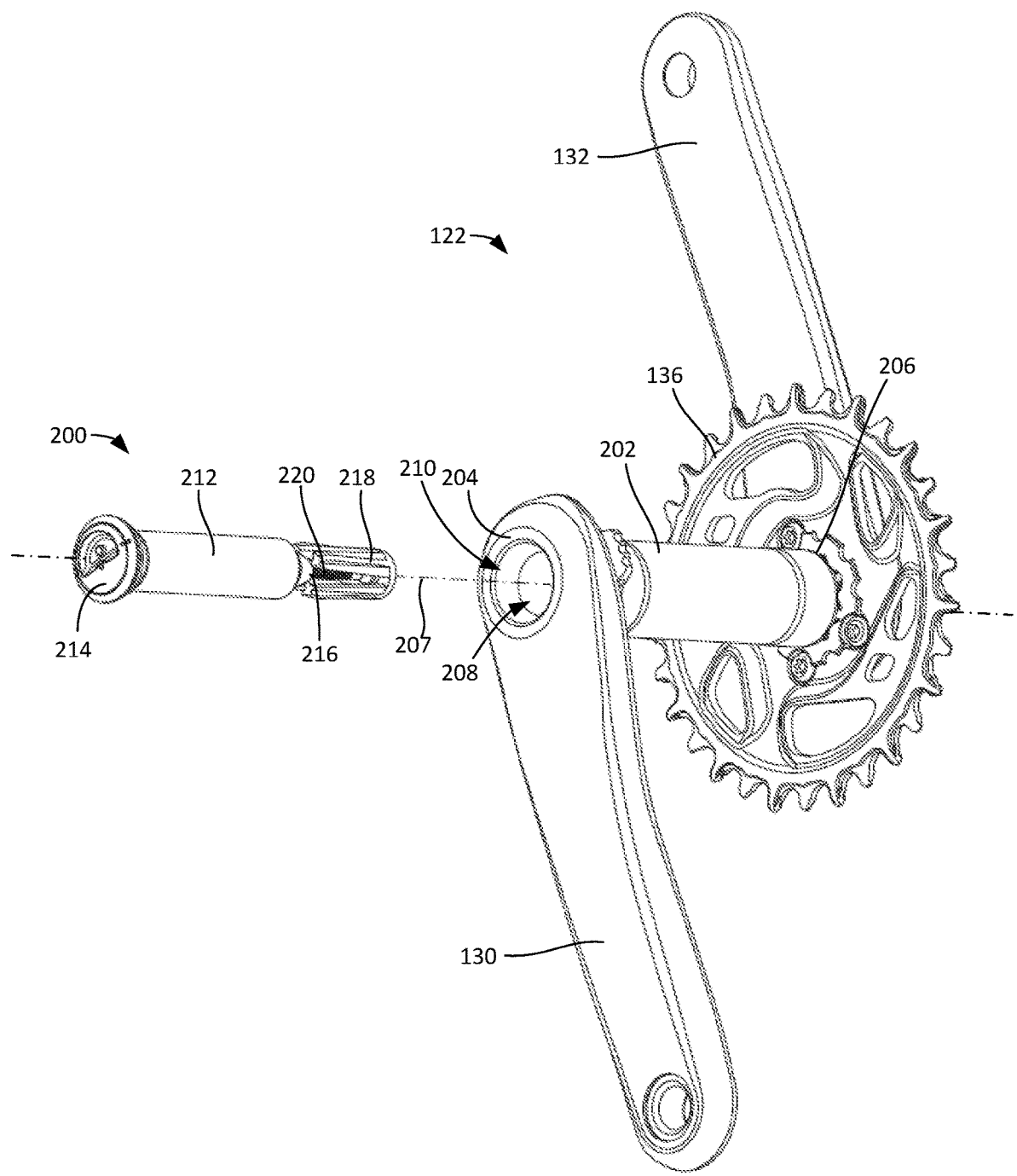
FIG. 2 is a perspective view of an example crankset with an example pedal detection device that may be implemented on the example bicycle of FIG. 1.

FIG. 2 is a perspective view of the crankset 122 and an example pedal detection device 200 constructed in accordance with the teachings of this disclosure. The pedal detection device 200 is shown as separated from the crankset 122. The pedal detection device 200 monitors movement of the crankset 122 and reports pedal activity. The pedal detection device 200 may be disposed in and/or otherwise integrated into the crankset 122, as disclosed in further detail herein.

The crankset 122 includes the first crank arm 130 and the second crank arm 132. The crankset 122 also includes a spindle 202 (sometimes referred to as a crank axle). When the crankset 122 is assembled on the bicycle 100 (FIG. 1), the spindle 202 is rotatably disposed within a bottom bracket shell (e.g., a journal) formed in the frame 102 (FIG. 1). The first crank arm 130 is coupled to a first end 204 of the spindle 202 and the second crank arm 132 is coupled to a second end 206 of the spindle 202. In the illustrated example, the chainring 136 is coupled (e.g., via threaded fasteners) to the spindle 202 adjacent the second crank arm 132. As the rider rotates (pedals) the first and second crank arms 130, 132, the first and second crank arms 130, 132 rotate the spindle and the chainring 136, which drives the chain 124 (FIG. 1) to propel the bicycle 100 (FIG. 1). The spindle 202 rotates about a rotational axis 207, which also corresponds to the central and longitudinal axes of the spindle 202.

As shown in FIG. 2, the spindle 202 has an internal passage or channel 208 formed between a first opening 210 in the first end 204 and a second opening (shown in FIG. 8) formed in the second end 206. In this example, the pedal detection device 200 can be inserted into the channel 208 of the spindle 202 via the first opening 210, and the pedal detection device 200 can be removed from the spindle 202 via the first opening 210. Thus, in this example, the pedal detection device 200 is installed on the non-drive side of the spindle 202 (the side opposite the chainring 136). In other examples, the pedal detection device 200 can instead be installed on the drive side of the spindle 202. When the pedal detection device 200 is installed in the spindle 202, the pedal detection device 200 is aligned along (e.g., coaxial with) the rotational axis 207.

In the illustrated example, the pedal detection device 200 includes an electronics module 212. The electronics module 212 includes one or more electrical components, such as a battery, a circuit board, a sensor, an LED, etc., as disclosed in further detail herein. The electronics module 212 has a first end 214 and a second end 216 opposite the first end 214.

To secure the electronics module 212 within the spindle 202, the pedal detection device 200 includes a retention member, such as an expander wedge 218 (which may also be referred to as an expanding collet). In the illustrated example, the expander wedge 218 is coupled to the second end 216 of the electronics module 212 via a driver 220. As disclosed in further detail herein, the expander wedge 218 can be moved axially toward the second end 216, which causes the expander wedge 218 to expand radially into an inner surface of the spindle 202. This action non-rotatably secures the pedal detection device 200 to the spindle 202. As such, as the user pedals the crankset 122, the pedal detection device 200 rotates with the spindle 202, such that the sensor(s) in the electronics module 212 can detect and/or measure the rotational movement and/or position of the spindle 202.

Figure 4:
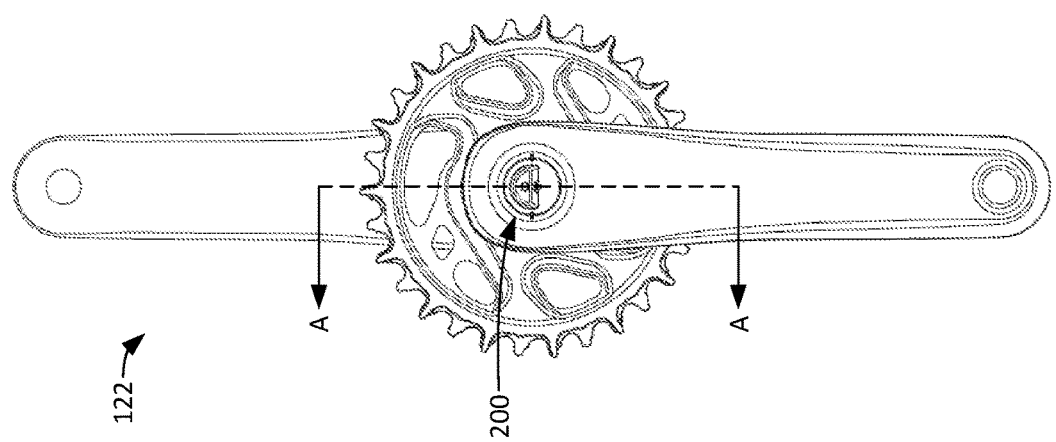
FIG. 4 is an end view of the example crankset with the example pedal detection device of FIG. 3.
Figure 3:
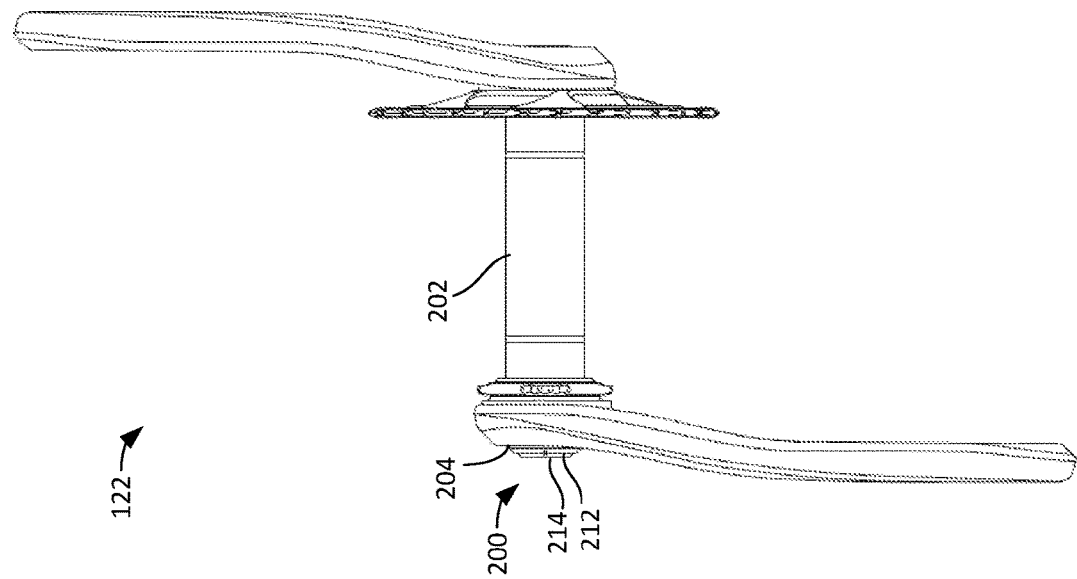
FIG. 3 is a side view of the example crankset of FIG. 2 with the example pedal detection device inserted into the example spindle of the example crankset.

FIGS. 3 and 4 show the pedal detection device 200 as installed in the spindle 202 of the crankset 122. In particular, the pedal detection device 200 has been inserted into the first opening 210 (FIG. 2) in the first end (204) of the spindle 202. The pedal detection device 200 is at least partially disposed in the channel 208 (FIG. 2). Therefore, the pedal detection device 200 is substantially surrounded or encompassed by the spindle 202. As such, the pedal detection device 200 is protected by the spindle 202 and is therefore less susceptible to damage compared to known pedal detection devices that are externally mounted to a crankset. As shown in FIG. 2, when the pedal detection device 200 is fully installed in the spindle 202, the first end 214 of the electronics module 212 protrudes from the first end 204 of the spindle 202. However, in other examples, the pedal detection device 200 and/or the spindle 202 may be sized such that the first end 214 of the electronics module 212 is flush or recessed relative to the first end 204 of the spindle 202 when the pedal detection device 200 is installed. The first end 214 may include a user interface having one or more indicators or buttons, as disclosed in further detail herein.

FIG. 5 is a side view of the pedal detection device 200. The pedal detection device 200 has a longitudinal or central axis 500. The electronics module 212, the expander wedge 218, and the driver 220 are all aligned along the central axis 500. When the pedal detection device 200 is installed in the spindle 202 (FIG. 2), the central axis 500 is aligned (coincident) with the rotational axis 207 (FIG. 2) of the spindle 202. The expander wedge 218 can be disposed a certain distance from an end of the electronics module 212 along the central axis 500.

FIG. 6 is an end view of the first end 214 of the electronics module 212 of the pedal detection device 200. When the pedal detection device 200 is installed in the spindle 202, the first end 214 remains visible and accessible by a user. In the illustrated example, the first end 214 of the electronics module 212 includes a user interface 600.

In the illustrated example, the user interface 600 includes an indicator 602, such as a light. The indicator 602 may illuminate different colors, intensities, and/or sequences to convey information to a user about the pedal detection device 200. For example, the indicator 602 may be configured to convey various information such as informing the user as to when the pedal detection device 200 is powered on or off, when the sensor in the pedal detection device 200 is detecting movement, when the pedal detection device 200 is pairing with a separate control unit (e.g., the mater controller 142 (FIG. 1)), when the pedal detection device 200 is transmitting data to the separate control unit, and/or when the power supply is low. In this example, the indicator 602 includes a light pipe 603. The light pipe 603 transmits light from a light source within the electronics module 212, such as an LED, disclosed in further detail herein.

In the illustrated example, the user interface 600 includes a button 604. The button 604 may be used (e.g., pressed or depressed) to perform various functions, such as turning the pedal detection device 200 on or off, initiating a pairing session with another component, checking the remaining power of the battery, etc. In the illustrated example, the button 604 is disposed in a recess 606 formed in the first end 214 of the electronics module 212. This recess 606 can also be seen in the perspective view in FIG. 4. As such, the button 604 is set back from the first end 214 of the electronics module 212. This helps protect the button 604 from damage and/or inadvertent actuation.

Figure 7:
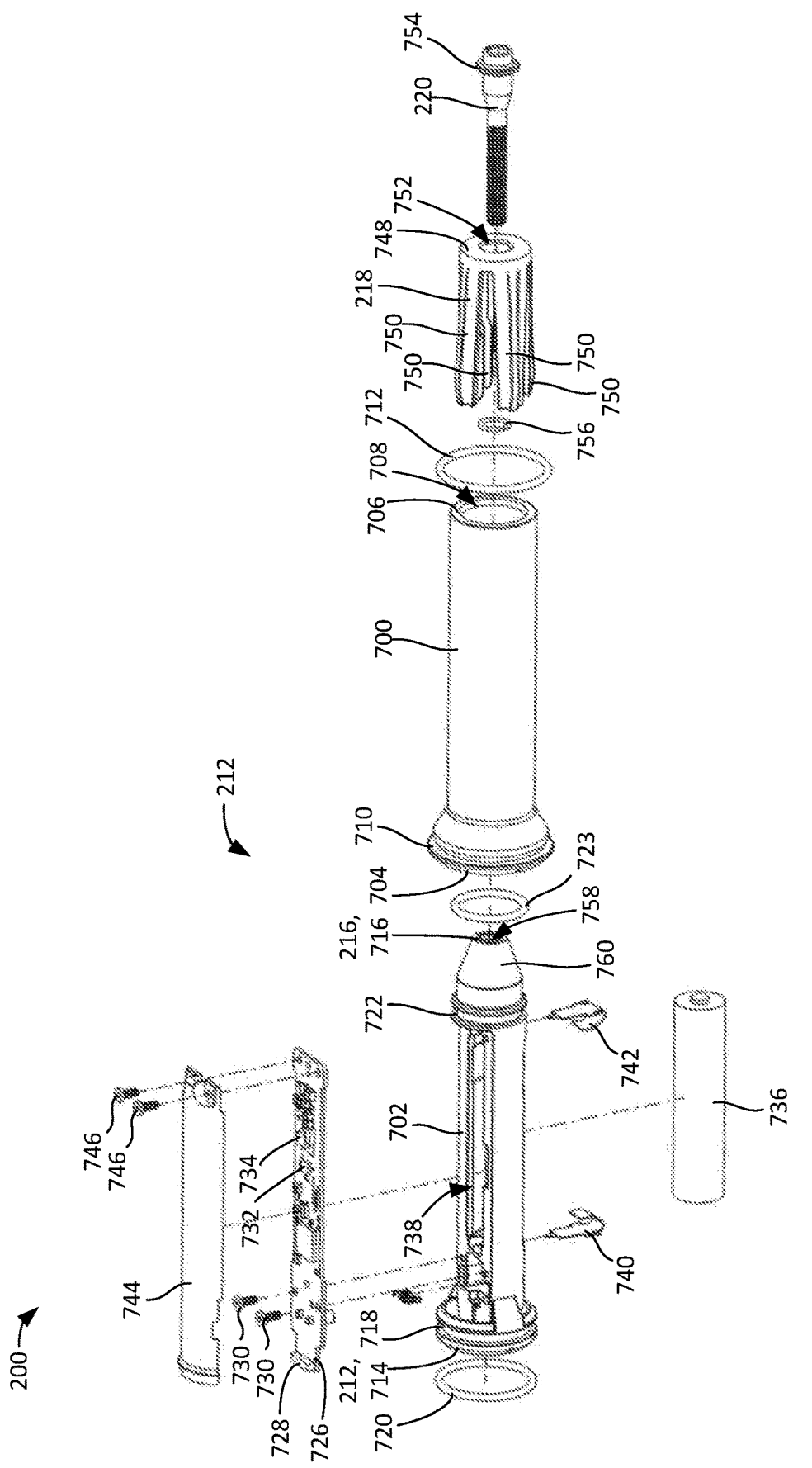
FIG. 7 is an exploded view of the example pedal detection device of FIG. 2.

FIG. 7 is an exploded view of the pedal detection device 200. The electronics module 212 may include one or more body or housing portions. In this example, the electronics module 212 includes a first body 700, referred to herein as a seal tube 700, and a second body 702, referred to herein as a core 702. The seal tube 700 has a first end 704, a second end 706, and a channel 708 between the first and second ends 704, 706. When the electronics module 212 is assembled, the core 702 is disposed within the channel 708 of the seal tube 700. The core 702 is slidable into and out of the seal tube 700. In some examples, the seal tube 700 and/or the core 702 are at least partially constructed of radio frequency (RF) transparent material to prevent or reduce wireless signal interference. Examples of radio frequency transparent materials include Teflon, polyethylene, polypropylene, polystyrene, polyvinyl chloride (PVC), acrylonitrile butadiene styrene (ABS), and/or other polymers or materials. In other examples, the seal tube 700 and/or the core 702 may be constructed of other material(s) (e.g., metal, carbon fiber, etc.).

In the illustrated example, the seal tube 700 has a seal gland 710 near the first end 704. A seal 712 (e.g., an o-ring) is to be disposed in the seal gland 710. When the electronics module 212 is assembled and inserted into the spindle 202 (FIG. 2), the seal 712 forms a sealing interface between the seal tube 700 and an inner surface of the spindle 202, which helps prevent water, debris, and other matter from entering the spindle 202.

The core 702 has a first end 714 and a second end 716 opposite the first end 714. The core 702 is longer than the seal tube 700. Therefore, when the electronics module 212 is assembled and the core 702 is disposed in the seal tube 700, the first and second ends 714, 716 of the core 702 extend outward beyond the first and second ends 704, 706 of the seal tube 700. As such, in this example, the first and second ends 714, 716 of the core 702 form the first and second ends 214, 216 of the electronics module 212. In the illustrated example, the core 701 has a first seal gland 718 near the first end 714 for a first seal 720 (e.g., an o-ring) and a second seal gland 722 near the second end 716 for a second seal 723 (e.g., an o-ring). When the electronics module 212 is assembled and the core 702 is disposed in the seal tube 700, the first and second seals 720, 723 provide a sealing interface between the core 702 and the seal tube 700.

In the illustrated example, the electronics module 212 includes a circuit board 726 having circuitry that implements a processor to receive and process (e.g., interpret) signal(s) from one or more sensors. The circuitry may also analyze and/or condition the signals (e.g., perform AC/DC conversion, filtering, etc.). The circuit board 726 may be implemented as any type of circuit board, such as a printed circuit board (PCB), a printed circuit board assembly (PCBA), or a flexible printed circuit. The circuitry may include any analog or digital circuit(s), logic circuit(s), programmable processor (s), programmable controller(s), application specific integrated circuit(s) (ASIC(s)), programmable logic device(s) (PLD(s)) and/or field programmable logic device(s) (FPLD (s)), for example. In some examples, the electronics module 212 includes a wireless transmitter 728 (e.g., an antenna) to transmit signals (e.g., information representative of the measurements from the sensor(s)). In this example, the wireless transmitter 728 is coupled to the circuit board 726. In other examples, the wireless transmitter 728 may be coupled to another structure (e.g., the core 702) and electrically coupled to the circuit board 726. The circuit board 726 is to be coupled to the core 702 via threaded fasteners 730 (e.g., bolts, screws, etc.). Any number of threaded fasteners may be used.

As disclosed herein, the electronics module 212 may include one or more sensors to measure and/or detect rotational velocity and/or position. For example, in FIG. 7, the electronic monitoring device 138 includes a first sensor 732 and a second sensor 734. In some examples, the first sensor 732 is an accelerometer and the second sensor 734 is a gyroscope. The first sensor 732 and/or the second sensor 734 may be used to detect or measure angular velocity and/or position of the spindle 202 as the spindle 202 rotates. In other examples, the electronics module 212 may include more or fewer sensors. Additionally or alternatively, the electronics module 212 may include other types of sensors. The sensor(s) 732, 734 are to be electrically coupled to the circuit board 726, such that the circuit board 726 receives the signals (e.g., measurements) from the sensors 732, 734. In this example, the sensors 732, 734 are mounted on the circuit board 726. In other examples, the first and/or second sensors 732, 734 may be separate from the circuit board 726 and coupled to the circuit board 726 via an electrical connection (e.g., a wire).

In some examples, the electronics module 212 includes a power supply to provide power to the sensor(s) 732, 734, the circuit board 726, and/or any other electrical component of the pedal detection device 200. In the illustrated example, the electronics module 212 includes a battery 736 implemented as the power supply. In other examples, more than one battery may be used. In this example, the battery 736 is a cylindrical battery, as a AAA battery or a AA battery. In other examples, other types of batteries may be used. Additionally or alternatively, the power supply may include other types of power storing and/or power generating devices. Further, in addition to or as an alternative to a power supply in the electronics module 212, the electronics module 212 may receive power from an external power supply and/or power generating device (e.g., a battery mounted on the frame 102 (FIG. 1), an electric generator on the bicycle 100 (FIG. 1), etc.)

In the illustrated example, the core 702 includes a cavity 738 to receive the battery 736. When the pedal detection device 200 is assembled, the circuit board 726 is coupled to the core 702 along the cavity 738, such that when the battery 736 is disposed in the cavity 738, the battery 736 is disposed adjacent the circuit board 726. In the illustrated example, the electronics module 212 includes first and second battery contacts 740, 742 (e.g., leaf springs). When the electronics module 212 is assembled, the first and second battery contacts 740, 742 are coupled to the circuit board 726 and extend into the cavity 738. The battery 736 can be inserted into the cavity 738 from the opposite side as the circuit board 726. When the battery 736 is inserted into the cavity 738, the terminals (the ends) of the battery 736 engage the battery contacts 740, 742, which creates an electrical connection to enable the battery 736 to power the circuit board 726 and other electrical components of the electronics module 212. As such, in this example, the battery 736 is coupled to the circuit board 726.

In this example, when the electronics module 212 is assembled, the circuit board 726 is disposed longitudinally along the core 702, and the battery 736 is disposed longitudinally in the core 702 adjacent (e.g., parallel to) the circuit board 726. As such, the battery 736 is disposed relatively close to the circuit board 726. In this example, the circuit board 726 and the battery 736 are in a plane that is perpendicular to the rotational axis 207 (FIG. 2). Further, the battery 736 is disposed along the central axis 500 (FIG. 5). This enables the use of a larger (e.g., longer) battery, but does not increase the length or diameter of the electronics module 212. This also enables the electronics module 212 to be more compact (for compatibility with many spindle designs) and aesthetically pleasing. In other examples, the battery 736 may be disposed in other locations separate from the circuit board 726.

In the illustrated example, the electronics module 212 includes a lid or cover 744 that can be coupled to the core 702 over the circuit board 726. The cover 744 protects the circuit board 726 and other electronic components from damage and electrostatic discharge (ESD) during use and while handling (e.g., when replacing the battery 736). In some examples, the cover 744 is at least partially constructed of RF transparent material to prevent or reduce wireless signal interference. The cover 744 can be coupled to the core 702 via threaded fasteners 746 (e.g., bolts, screws, etc.). In this example, the threaded fasteners 746 also extend through the circuit board 726 to couple the circuit board 726 to the core 702. Any number of threaded fasteners may be used.

As disclosed above, the pedal detection device 200 includes the expander wedge 218. In the illustrated example, the expander wedge 218 has a base 748 and a plurality of arms 750 (e.g., springs) extending from the base 748. In this example, the expander wedge 218 has four arms 750. In other examples, the expander wedge 218 may include more or fewer arms (e.g., one arm, two arms, three arms, five arms, etc.). The arms 750 can be flexed radially outward or inward relative to the base 748.

In the illustrated example, the base 748 has an opening 752. When the pedal detection device 200 is assembled, the driver 220 extends through the opening 752 in the base 748 of the expander wedge 218. In this example, the driver 220 is a bolt (e.g., an Allen bolt). The driver 220 has a flange 754 with a larger diameter than the opening 752. A retainer 756 secures the base 748 against the flange 754, thereby coupling the expander wedge 218 to the driver 220.

In the illustrated example, a threaded bore 758 is formed in the second end 716 of the core 702. When the pedal detection device 200 is assembled, the driver 220 is threadably engaged with the threaded bore 758. The driver 220 can be screwed into the threaded bore 758 to move the expander wedge 218 axially toward the second end 716 of the core 702 or unscrewed from the threaded bore 758 to move the expander wedge axially away from the second end 716 of the core 702. Therefore, the expander wedge 218 is movably coupled to the electronics module 212 via the driver 220. As shown in FIG. 7, the second end 716 of the core 702 has a tapered portion 760. Therefore, as the expander wedge 218 is moved axially toward the second end 716, the arms 750 slide along the tapered portion 760, thereby forcing the arms 750 to expand radially (i.e., move radially outward). This action may be used to secure the pedal detection device 200 in the spindle 202 (FIG. 2), as shown in further detail in connection with FIGS. 10 and 11. When the driver 220 is unscrewed from the threaded bore 758, the expander wedge 218 is moved away from the second end 716 of the core 702 and the arms 750 return to their unbiased state (e.g., the state shown in FIG. 7).

Figure 8:
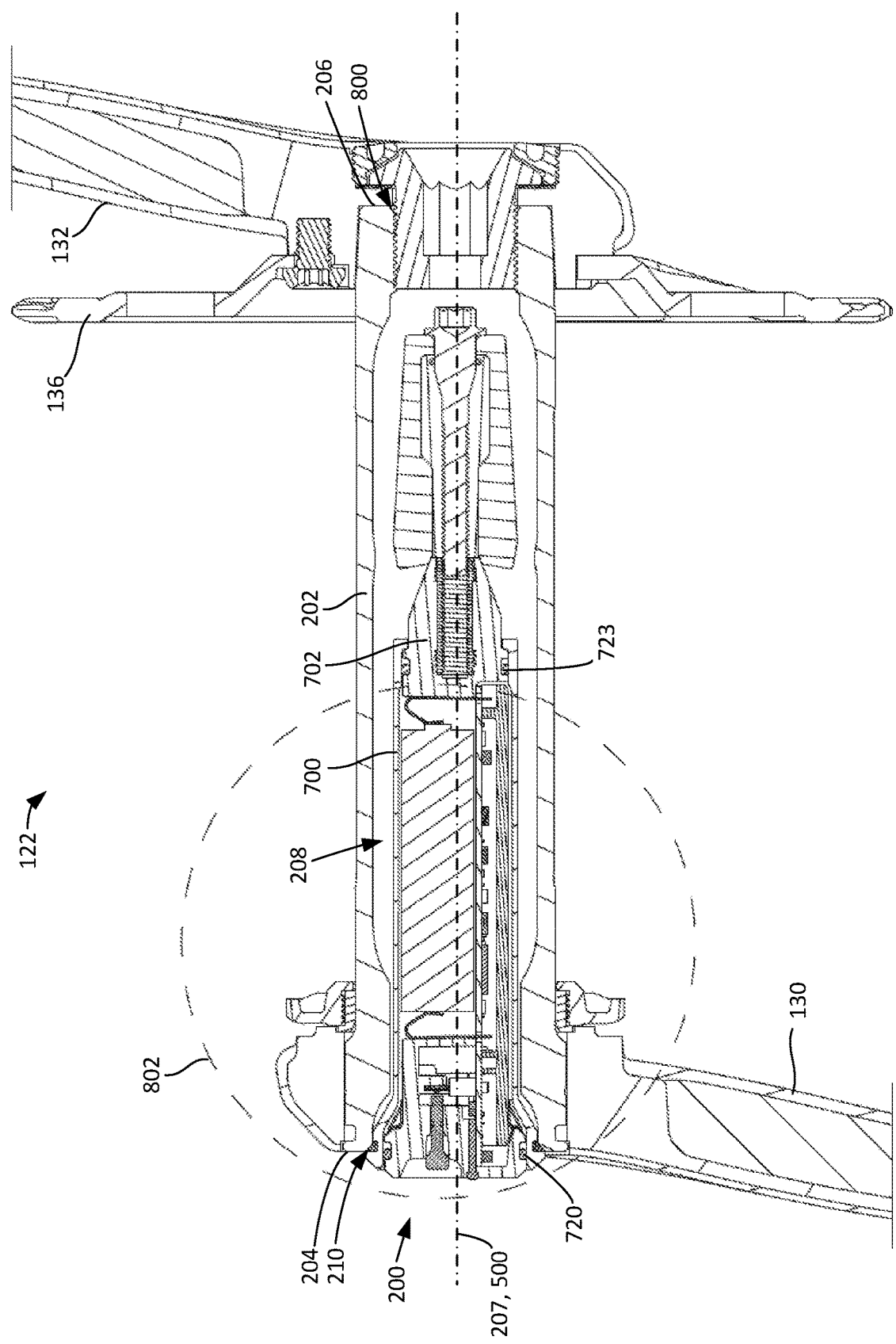
FIG. 8 is a cross-sectional view of the example crankset with the example pedal detection device taken along line A-A of FIG. 4.

FIG. 8 is a cross-sectional view of the pedal detection device 200 disposed in the channel 208 in the spindle 202 of the crankset 122 taken along line A-A of FIG. 4. The first and second crank arms 130, 132 and the chainring 136 are also shown in FIG. 8. As shown in FIG. 8, the channel 208 in the spindle 202 extends between the first opening 210 in the first end 204 of the spindle 202 and a second opening 800 in the second end 206 of the spindle 202. The pedal detection device 200 has been inserted into the channel 208 of the spindle 202 through the first opening 210. As shown in FIG. 8, the pedal detection device 200 does not extend all the way to the second end 206 of the spindle 202. The central axis 500 of the pedal detection device 200 is aligned (coincident) with the rotational axis 207.

In FIG. 8, the expander wedge 218 is in an unexpanded state. The expander wedge 218 may be expanded to secure the pedal detection device 200 to the spindle 202, an example of which is described in further detail in connection with FIGS. 10 and 11.

As shown in FIG. 8, the first and second seals 720, 723 are disposed between the seal tube 700 and the core 702. The electronic components are disposed between the first and second seals 720, 723. Thus, the first and second seals 720, 723 create sealing interfaces that prevent or limit water, debris, and/or other materials from entering the space between the core 702 and the seal tube 700 from either side of the electronics module 212.

Figure 9:
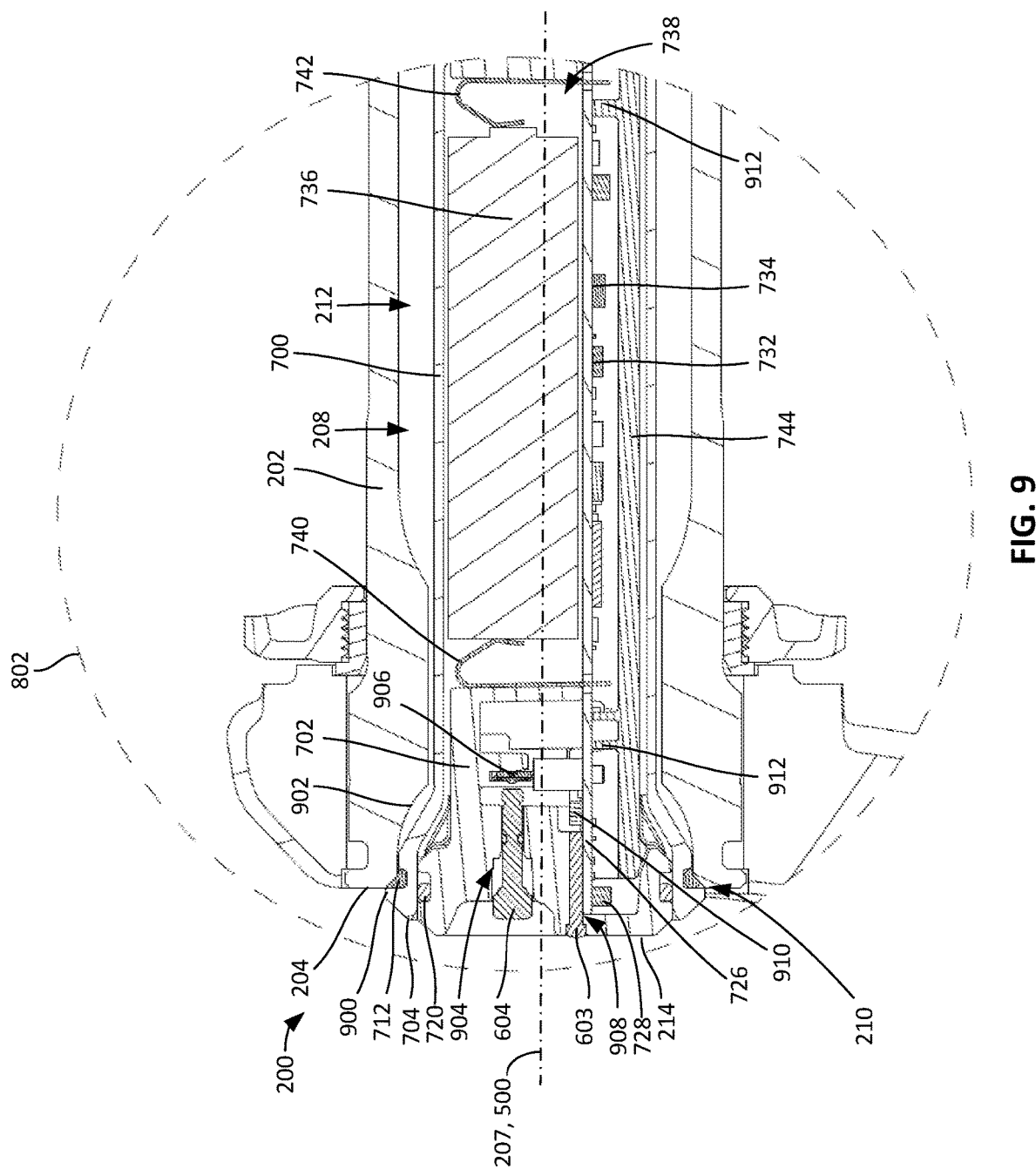
FIG. 9 is an enlarged view of the callout in FIG. 8.

FIG. 9 is an enlarged view of the callout 802 in FIG. 8. As shown in FIG. 9, when the pedal detection device 200 is fully inserted into the spindle 202, a flange 900 near the first end 704 of the seal tube 700 engages the first end 204 of the spindle 202. The seal 712 creates a sealing interface between the seal tube 700 and an inner surface 902 of the spindle 202 to prevent or limit water, debris, and/or other materials from entering the channel 208 and affecting the electronic components in the electronics module 212.

In this example, a portion of the electronics module 212 extends outward from the first end 204 of the spindle 202 when the pedal detection device 200 is fully installed. In other examples, the pedal detection device 200 and/or the spindle 202 may be sized such that the first end 214 of the electronics module 212 is flush or recessed relative to the first end 204 of the spindle 202 when the pedal detection device 200 is installed.

As shown in FIG. 9, the button 604 is disposed in a passageway 904 formed in the core 702. The button 604 is movable (e.g., left and right in FIG. 9) in the passageway 904. When the button 604 is pressed (e.g., moved to the right in FIG. 9), the button 604 engages a contact switch 906 that is electrically coupled to the circuit board 726. In some examples, the contact switch 906 provides a return biasing force on the button 604 to move the button 604 outward (e.g., to the left in FIG. 9).

In the illustrated example, the light pipe 603 extends through a passageway 908 formed in the core 702. An end of the light pipe 603 is in contact with or disposed adjacent a light, such as an LED 910. In this example, the LED 910 is coupled to the circuit board 726. The LED 910 is activated via the circuitry on the circuit board 726. When the LED 910 is activated, the LED 910 illuminates the light pipe 603, which can be seen by a user on the first end 214 of the electronics module 212. As disclosed above, the LED 910 can be activated to provide various information to the user (e.g., the state (on or off) of the device, the remaining battery life, etc.).

In the illustrated example, the wireless transmitter 728 is coupled to the circuit board 726 at or near an end of the circuit board 726 adjacent the first end 214 of the electronics module 214. As such, in this example, the wireless transmitter 728 is disposed outside of the spindle 202 (e.g., beyond the first opening 210 in the first end 214 of the spindle 202). In some examples, having the wireless transmitter 728 at or outside of the first end 214 of the spindle 202 helps to reduce the amount of signal interference from the surrounding structures. In other examples, the wireless transmitter 728 can be disposed in another location such that the wireless transmitter 728 is disposed inside of the spindle 202. In the illustrated example, the wireless transmitter 728 is offset from the rotational axis 207. In other examples, the wireless transmitter 728 can be disposed in another location such that the wireless transmitter 728 is disposed along the rotational axis 207.

As shown in FIG. 9 the battery 736 is disposed in the cavity 738 formed in the core 702. The battery 736 is held in the cavity 738 via pressure from the first and second battery contacts 740, 742. The battery 736 is disposed along the circuit board 726. As disclosed above, this arrangement enables a shorter overall package, as compared to an arrangement where the battery is disposed at an end of the circuit board 726.

To replace the battery 736, a user may pull the pedal detection device 200 out of the first opening 210 of the spindle 202. Then, the core 702 may be removed from the seal tube 700, which exposes the battery 736. Then, the battery 736 can be removed from the cavity 738 and charged or replaced with another battery. After the battery is charged or replaced, the pedal detection device 200 can be reinserted into the spindle 202. In other examples, the seal tube 700 may remain in the spindle 202, and only the core 702 may be slid out from the seal tube 700. In such an example, the driver 220 (FIG. 7) would be completely unscrewed from the second end 716 (FIG. 7) of the core 702. After the battery 736 is charged or replaced, the core 702 can be reinserted into the seal tube 700 in the spindle 202, and the driver 220 can be screwed back into the second end 716 of the core 702.

As shown in FIG. 9, the cover 744 is coupled to the core 702 and covers the circuit board 726. In the illustrated example, the cover 744 has contact multiple points 912 that press against the circuit board 726, thereby clamping the circuit board 726 between the cover 744 and the core 702. In this example, the circuit board 726 is offset from the central axis 500 of the pedal detection device 200 and, thus, is offset from the rotational axis 207. Thus, in this example, the sensors 732, 734 are offset from (e.g., off axis relative to) the rotational axis 207. As the pedal detection device 200 rotates with the spindle 202, the sensors 732, 734 rotate around (e.g., orbit) the rotational axis 207. This still permits the determination of angular velocity and position values. In other examples, the sensors 732, 734 may be mounted in other locations such that one or both of the sensors 732, 734 are disposed on the rotational axis 207.

Figure 10:
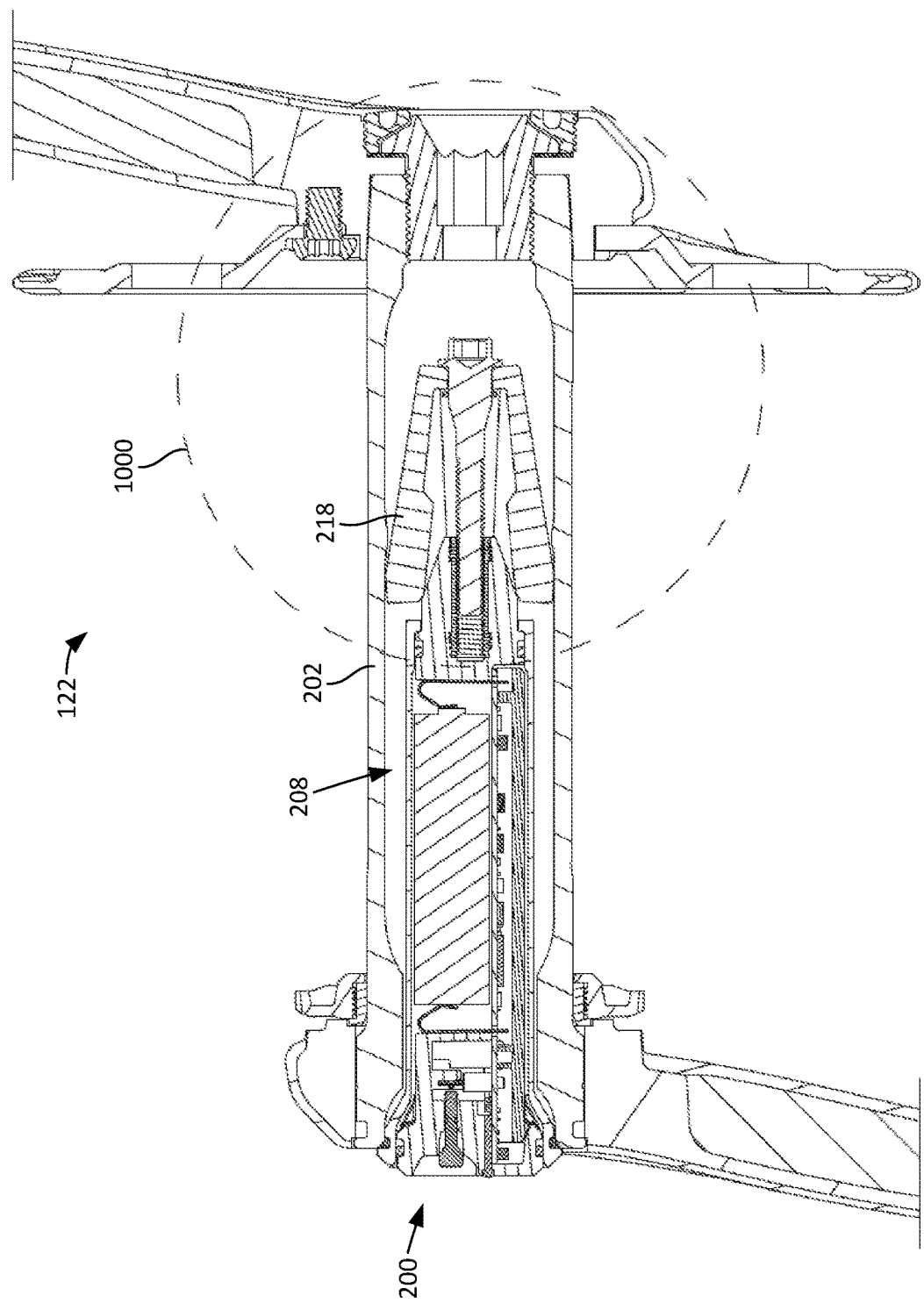
FIG. 10 is a cross-sectional view of the example crankset with the example pedal detection device taken along line A-A of FIG. 4.

FIG. 10 is another cross-sectional view of the pedal detection device 200 disposed in the channel 208 in the spindle 202 of the crankset 122 taken along line A-A of FIG. 4, similar to FIG. 8. In FIG. 10, the expander wedge 218 has been expanded, which secures or locks the pedal detection device 200 to the spindle 202.

Figure 11:
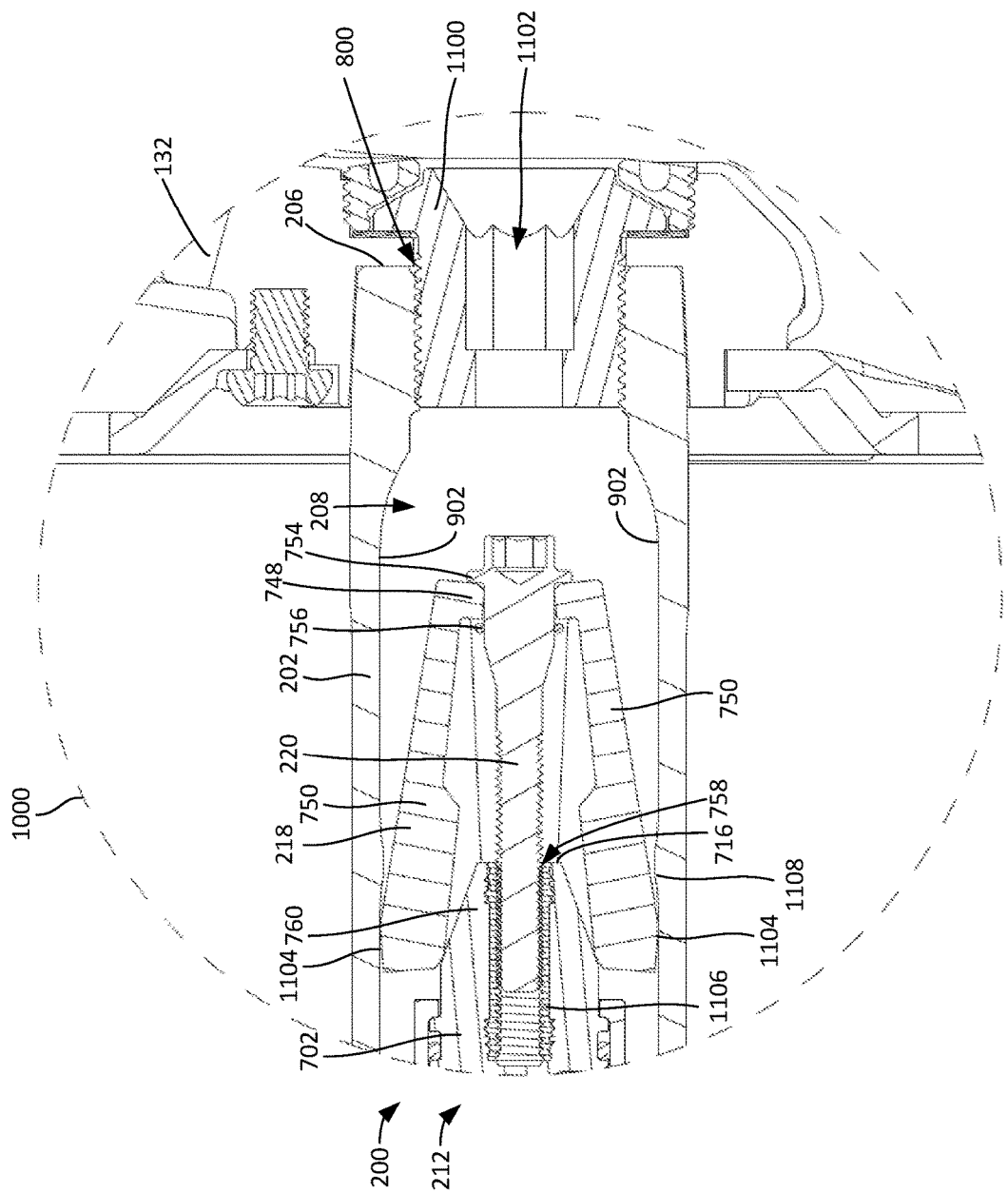
FIG. 11 is an enlarged view of the callout in FIG. 10.

FIG. 11 is an enlarged view of the callout 1000 in FIG. 10. To secure the pedal detection device 200 to the spindle 202, a user may screw the driver 220 into the threaded bore 758 in the second end 716 of the core 702. In some examples, a user may use a tool (e.g., an Allen wrench) to rotate the driver 220. The user may access the driver 220 through the second opening 800 in the second end 206 of the spindle 202. For example, as shown in FIG. 11, the second crank arm 132 is coupled to the second end 206 of the spindle 202 via a threaded fastener 1100 (e.g., an Allen bolt). The threaded fastener 1100 has a central opening 1102. A user may insert a tool through the central opening 1102 and into the channel 208 to access the head (e.g., socket) of the driver 220. In some examples, after the tool is removed, the user may insert a seal into the central opening 1102 to prevent water, debris, and other material from entering the channel 208 in the spindle 202.

As shown in FIG. 11, the base 748 of the expander wedge 218 is coupled between the retainer 756 and the flange 754 of the driver 220. As the driver 220 is screwed into the second end 716 of the core 702, the driver 220 moves the expander wedge 218 axially toward the second end 716. The arms 750 slide along the tapered portion 760 of the core 702, which causes the arms 750 to move (flex) radially outward. Outer surfaces 1104 of the arms 750 are pressed into firm engagement with the inner surface 902 of the spindle 202. This engagement creates friction that resists axial and rotational movement of the expander wedge 218, thereby locking or securing the pedal detection device 200 in the spindle 202. The driver 220 can be further tightened, which pulls the electronics module 212 further into the spindle 202 and tightens the joint between the flange 900 (FIG. 9) and the first end 204 (FIG. 9) of the spindle 202. In this example, the outer surfaces 1104 of the arms 750 engage the inner surface 902 along the same axial and radial dimension. In other examples, the expander wedge 212 can be configured such that the arms 750 engage the inner surface 902 at different axial and/or radial dimensions (e.g., one of the arms 750 may be shorter). In some examples, the arms 750 are constructed of glass filled nylon. In other examples, the arms 750 can be constructed of other types of materials (e.g., plastic, rubber, etc.). In some examples, the body or core of the arms 750 are constructed of one type of material and the outer surfaces 1104 of the arms 750 are constructed of another type of material. For example, the body or core of the arms 750 may be constructed of a composite of hard plastic, and the outer surfaces 1104 may be constructed of a softer material, such as rubber, to provide grip and friction with the inner surface 902.

To release or unlock the pedal detection device 200 from the spindle 202, a user can unscrew the driver 220 (e.g., using an Allen wrench). When the driver 220 is unscrewed, the driver 220 moves the expander wedge 218 axially away from the second end 716 of the core 702, and the arms 750 retract radially inward to their unflexed state (shown in FIG. 8). Once the arms 750 are contracted enough, the pedal detection device 200 can be removed from the first opening 210 (FIG. 2) in the spindle 202. In some examples, when the driver 220 is unscrewed from the threaded bore 758, the pressure of the arms 750 on the tapered portion 760 of the core 702 helps push the expander wedge 218 axially away from the second end 716 of the core 702. Therefore, axial movement of the driver 220 causes and/or otherwise enables the expander wedge 218 to radially expand or contract.

In some examples, the core 702 is constructed of a lighter, less expensive material, such as plastic. In some such examples, the threaded bore 758 may be constructed of a more rigid material, such as metal, which reduces bolt thread friction and wear and increases the strength of the joint. For example, the threaded bore 758 may be formed by a metal insert 1106 disposed in the second end 716 of the core 702 (e.g., the metal insert 1106 may be molded into the second end 716 of the core 702). As shown in FIG. 11, the thickness of the spindle 202 may be enlarged at certain sections, such as the section labeled 1108, to improve strength and fatigue life.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A pedal detection device for a bicycle, the pedal detection device comprising:
   an electronics module to be disposed in a spindle of a crankset of the bicycle, the electronics module including a sensor to detect angular velocity and/or position of the spindle;
   a driver; and
   an expander wedge movably coupled to the electronics module via the driver, wherein axial movement of the expander wedge relative to the electronics module causes the expander wedge to expand radially,
   wherein the electronics module includes a body with a first end and a second end opposite the first end, the expander wedge is movably coupled to the second end of the body, the expander wedge has a base and a plurality of arms extending from the base, and the driver is threadably engaged with a threaded bore formed in the second end of the body, and
   wherein the body is constructed of plastic, and the threaded bore is formed by a metal insert disposed in the second end of the body.

2. The pedal detection device of claim 1, wherein the second end of the body has a tapered portion, and wherein, when the driver moves the expander wedge axially toward the second end of the body, the arms slide along the tapered portion, thereby forcing the arms to expand radially.

3. The pedal detection device of claim 1, wherein the driver is a bolt.

4. The pedal detection device of claim 1, wherein the driver extends through an opening in the base of the expander wedge.

5. The pedal detection device of claim 4, wherein the base of the expander wedge is coupled between a retainer and a flange on the driver.

6. A pedal detection device for a bicycle, the pedal detection device comprising:

an electronics module to be disposed in a spindle of a crankset of the bicycle, the electronics module including a sensor to detect angular velocity and/or position of the spindle;

a driver; and an expander wedge movably coupled to the electronics module via the driver, wherein axial movement of the expander wedge relative to the electronics module causes the expander wedge to expand radially, wherein the electronics module includes a body with a first end and a second end opposite the first end, the expander wedge is movably coupled to the second end of the body, and the first end of the body includes a user interface.

7. The pedal detection device of claim 6, wherein the user interface includes a button disposed in a recess formed in the first end of the body.

8. A crankset for a bicycle, the crankset comprising:

a spindle having a first end, a second end opposite the first end, and a channel formed between a first opening in the first end and a second opening in the second end;

a first crank arm coupled to the first end of the spindle;

a second crank arm coupled to the second end of the spindle; and a pedal detection device at least partially disposed in the channel of the spindle, the pedal detection device including:

an electronics module including a sensor to detect angular velocity and/or position of the spindle; and an expander wedge to secure the electronics module to the spindle, wherein the pedal detection device is inserted into the first opening in the first end of the spindle, wherein the expander wedge is movably coupled to end of the electronics module via a bolt, and wherein the bolt is accessible through the second opening in the second end of the spindle.

9. The crankset of claim 8, wherein the expander wedge is movably coupled to an end of the electronics module.

10. The crankset of claim 9, wherein moving the expander wedge axially toward the electronics module causes the expander wedge to expand radially and engage an inner surface of the spindle.

11. A pedal detection device for a bicycle, the pedal detection device comprising:

an electronics module to be disposed in a spindle of a crankset of the bicycle, the electronics module including:

a body defining a cavity to receive a battery;

a circuit board coupled to the body along the cavity, such that when the battery is disposed in the cavity, the battery is disposed adjacent the circuit board; and a sensor to detect angular velocity and/or position of the spindle, wherein the electronics module includes first and second battery contacts coupled to the circuit board and extending into the cavity.

12. A pedal detection device for a bicycle, the pedal detection device comprising:

an electronics module to be disposed in a spindle of a crankset of the bicycle, the electronics module including:

a body defining a cavity to receive a battery;

a circuit board coupled to the body along the cavity, such that when the battery is disposed in the cavity, the battery is disposed adjacent the circuit board; and a sensor to detect angular velocity and/or position of the spindle, wherein the circuit board is offset from a rotational axis of the spindle.

13. The pedal detection device of claim 12, wherein the sensor is coupled to the circuit board and offset from the rotational axis of the spindle.

* * * * *